United States Patent
Cho et al.

(10) Patent No.: US 10,406,737 B2
(45) Date of Patent: Sep. 10, 2019

(54) INJECTION MOLDING APPARATUS FOR WORM WHEEL

(71) Applicant: MTC CO., LTD., Gunpo-si, Gyeonggi-do (KR)

(72) Inventors: Jung kwon Cho, Gwacheon-si (KR); Ki jung Cho, Pyeongtaek-si (KR); Kwang ryeal Choi, Pyeongtaek-si (KR); Won bum Sohn, Yongin-si (KR); Sung jae Yoo, Uiwang-si (KR)

(73) Assignee: MTC CO., LTD., Gunpo-si, Gyeonggi-Do (KR)

( * ) Notice: Subject to any disclaimer, the term of this patent is extended or adjusted under 35 U.S.C. 154(b) by 227 days.

(21) Appl. No.: 15/558,243

(22) PCT Filed: Mar. 11, 2016

(86) PCT No.: PCT/KR2016/002425
§ 371 (c)(1),
(2) Date: Sep. 14, 2017

(87) PCT Pub. No.: WO2016/148443
PCT Pub. Date: Sep. 22, 2016

(65) Prior Publication Data
US 2018/0043594 A1 Feb. 15, 2018

(30) Foreign Application Priority Data
Mar. 18, 2015 (KR) .......................... 10-2015-0037204

(51) Int. Cl.
*B29C 45/14* (2006.01)
*B29C 45/44* (2006.01)
(Continued)

(52) U.S. Cl.
CPC ............ *B29C 45/401* (2013.01); *B29C 45/03* (2013.01); *B29C 45/04* (2013.01); *B29C 45/14* (2013.01);
(Continued)

(58) Field of Classification Search
CPC ...... B29C 45/14467; B29C 2045/4485; B29C 45/44; B29C 45/401; B29L 2015/003
See application file for complete search history.

(56) References Cited

FOREIGN PATENT DOCUMENTS

| | | | |
|---|---|---|---|
| JP | 01285823 A | * 11/1989 | ............ B29C 45/44 |
| JP | 06-087141 | 3/1994 | |

(Continued)

OTHER PUBLICATIONS

International Search Report for International Application No. PCT/KR2016/002425, dated Jun. 8, 2016.
(Continued)

*Primary Examiner* — Robert B Davis
(74) *Attorney, Agent, or Firm* — Kile Park Reed & Houtteman PLLC

(57) ABSTRACT

Provided is an injection molding apparatus for a worm wheel, in which the worm wheel is not only integrally manufactured by an injection mold method, but a gear teeth structure of a gear forming unit is also manufactured as an injection mold without a hobbing operation, and the structure of the injection molding apparatus is also improved so that worm wheel products can be easily taken out from the injection mold. The injection molding apparatus includes: a boss injection mold; a product injection mold having a movable side core, a fixed side core, and a worm gear tooth-shaped core; and a take-out unit for taking out a worm wheel product formed with a worm gear by the product injection mold, wherein the take-out unit includes: a plural-
(Continued)

ity of take-out pins; a take-out plate; and a guide unit guiding rotation of the worm gear tooth-shaped core.

3 Claims, 7 Drawing Sheets

(51) Int. Cl.
  *B29C 45/40* (2006.01)
  *B29C 45/03* (2006.01)
  *F16H 55/22* (2006.01)
  *B29C 45/04* (2006.01)
  *B29K 705/00* (2006.01)
  *B29L 15/00* (2006.01)

(52) U.S. Cl.
  CPC ........ *B29C 45/14467* (2013.01); *B29C 45/40* (2013.01); *B29C 45/44* (2013.01); *F16H 55/22* (2013.01); *B29K 2705/00* (2013.01); *B29L 2015/003* (2013.01)

(56) References Cited

FOREIGN PATENT DOCUMENTS

| | | |
|---|---|---|
| JP | 07-304064 | 11/1995 |
| JP | 2003-048236 | 2/2003 |
| KR | 10-2004-0080045 | 9/2004 |
| KR | 10-2009-0016130 | 2/2009 |
| KR | 10-2013-0100411 | 9/2013 |

OTHER PUBLICATIONS

Written Opinion for International Application No. PCT/KR2016/002425 with English translations, dated Jun. 8, 2016.

* cited by examiner

INJECTION MOLDING APPARATUS FOR WORM WHEEL

TECHNICAL FIELD

The present disclosure relates to an injection molding apparatus for a worm wheel, and more particularly, to an injection molding apparatus for a worm wheel, in which the worm wheel is not only integrally manufactured by an injection mold method, but a gear teeth structure of a gear forming unit is also manufactured as an injection mold without a hobbing operation, and the structure of the injection molding apparatus is also improved so that manufactured worm wheel products can be easily taken out from the injection mold.

BACKGROUND ART

Generally, a worm shaft and a worm wheel are used to transmit a driving force of a motor. When such a worm shaft and a worm wheel are made of a metal material, noise or vibration occurs at a portion contacting each other.

Accordingly, the worm shaft is made of a metal material such as steel, and the worm wheel is made of a synthetic resin material (or a plastic material) on a boss made of a metal such as steel in which the worm shaft is integrally formed with a gear portion having a toothed shape.

In the conventional method of manufacturing a worm wheel, a press-fitting method and an injection method are mainly used. In the press-fitting method, the boss cut to have a predetermined thickness is press-fitted into the center of the gear portion cut to have the same thickness as the boss and the bonding portion between the boss and the gear portion is fused at high frequency. Thereafter, teeth are post-processed to have a toothed shape on the outer circumferential surface of the gear portion to complete the manufacture of a worm wheel.

However, the conventional press-fitting method has a problem in that the manufacturing process is complicated and takes a long time to manufacture, and the post-processing is required to form the teeth, thereby lowering the productivity.

As a conventional prior art technology for solving the problem of the conventional press-fitting method, as disclosed in Korean Patent Laid-Open Publication No. 2009-0016130 (published on Feb. 13, 2009), there has been proposed a 'method of manufacturing a worm wheel for a reducer gear of a steering apparatus using injection molding', which manufactures a worm wheel by placing a boss in an injection mold and then discharging a resin melt to the injection mold.

However, the injection method of the worm wheel manufacturing method described above requires not only a hobbing process for post-processing additional teeth using a hob to the gear portion formed by injection but also faces a difficulty in a precise dimension control due to a resin shrinkage problem.

In addition, in the conventional injection method, the roundness and the concentricity of a hub and a boss coincide with each other due to an assembly error in which an axis is shaken during a process of press-fitting a worm wheel shaft into a worm wheel hub after molding a worm wheel boss and a gear forming portion which are individual elements of the worm wheel as a complete product, in which case, it is difficult to process the gear teeth using the hob.

As a prior art technology for improving this, as disclosed in Korean Patent Laid-Open Publication No. 10-2013-0100411 entitled "Worm wheel of an electric power assisted steering apparatus and method of manufacturing the same" (published on Sep. 11, 2013), the worm wheel is manufactured in a speed reducer of the electric power assisted steering apparatus, by integrally injection molding the hub, the boss, and the gear forming portion, to thereby improve formability of the worm wheel.

However, in this case, in view of the structural property formed at an inclined angle of the gear teeth in the gear forming portion, the gear forming portion is interfered with the injection mold due to the gear teeth during a process of taking out the gear forming portion from the injection mold. Accordingly, it is difficult to take out the gear forming portion from the injection mold and there is a possibility of occurrence of a deformation of the gear teeth interfered with the injection mold during the process of taking out the gear forming portion from the injection mold.

DISCLOSURE

Technical Problem

The present disclosure has been made in view of the above-described problems, and it is an object of the present disclosure to provide an injection molding apparatus for a worm wheel in which a worm wheel can be manufactured with an injection mold and a gear structure of a gear forming portion can be manufactured with an injection mold without a hobbing operation, and in which the structure of the injection molding apparatus is improved so that a manufactured worm wheel product can be easily taken out from an injection mold.

Technical Solution

According to an aspect of the present disclosure for achieving the above object, there is provided an injection molding apparatus for a worm wheel, the injection molding apparatus comprising: a boss injection mold; a product injection mold having a movable side core on which a worm wheel boss integrated with a worm wheel hub into which a worm wheel shaft is press-fitted by the boss injection mold is mounted to move forward and backward, a fixed side core whose inner side surface is placed to face the movable side core and on an outer side of which a resin injection inlet is provided, and a worm gear tooth-shaped core placed on an inner side of the movable side core and configured in a gear tooth shape of a worm gear on an inner circumferential surface thereof; and a take-out unit for taking out a worm wheel product formed with a worm gear by the product injection mold.

Preferably but not necessarily, the take-out unit comprises: a plurality of take-out pins coupled to penetrate the movable side core; a take-out plate coupled to have ends of the plurality of take-out pins fixed; and a guide unit guiding rotation of the worm gear tooth-shaped core at the time of taking out the worm wheel product.

Preferably but not necessarily, the guide unit comprises: guide bars vertically penetrating both sides of the movable side core and whose lower portions are coupled to be fixed to the take-out plate and having a guide groove formed at an inclined angle on an inner side of each of the guide bars facing each other; and ball members which are coupled to protrude on an outer circumference of the worm gear tooth-shaped core in which the protruded outer circumferential portions of the worm gear tooth-shaped core are received in the guide grooves.

Preferably but not necessarily, the guide unit further comprises a plurality of ball bearings arranged to be interposed between an outer circumferential surface of the worm tooth-shaped core and the movable side core.

Advantageous Effects

According to the present disclosure, a worm wheel shaft and a worm wheel hub are integrally formed with a worm wheel boss in a state where the worm wheel shaft and the worm wheel hub are axially coupled by a boss injection mold, a gear forming portion is integrally formed on an outside of the worm wheel boss integrated with the worm wheel hub by a product injection mold, and rotation of a worm gear tooth-shaped core is guided during a process of taking out the worm wheel product manufactured by the product injection mold, to thereby improve a mold ability by eliminating an interference phenomenon of a gear undercut portion of the gear teeth of the gear forming portion, and molding a gear tooth shape of a worm wheel without a separate hobbing operation.

BEST MODE FOR CARRYING OUT THE INVENTION

Figure 1:
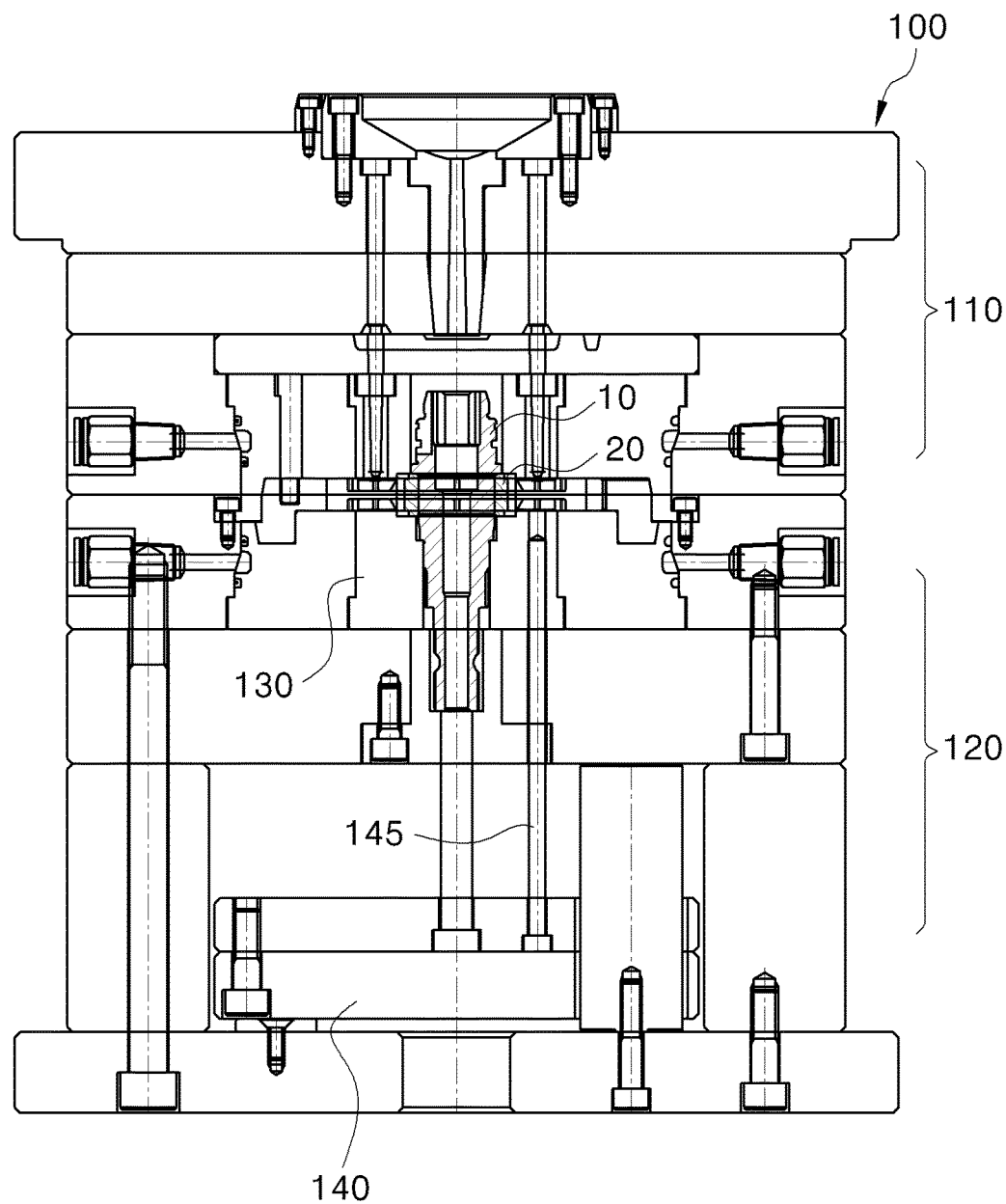
FIG. 1 is a diagram showing a configuration of a boss injection mold of an injection molding apparatus for a worm wheel according to the present disclosure.
Figure 2:
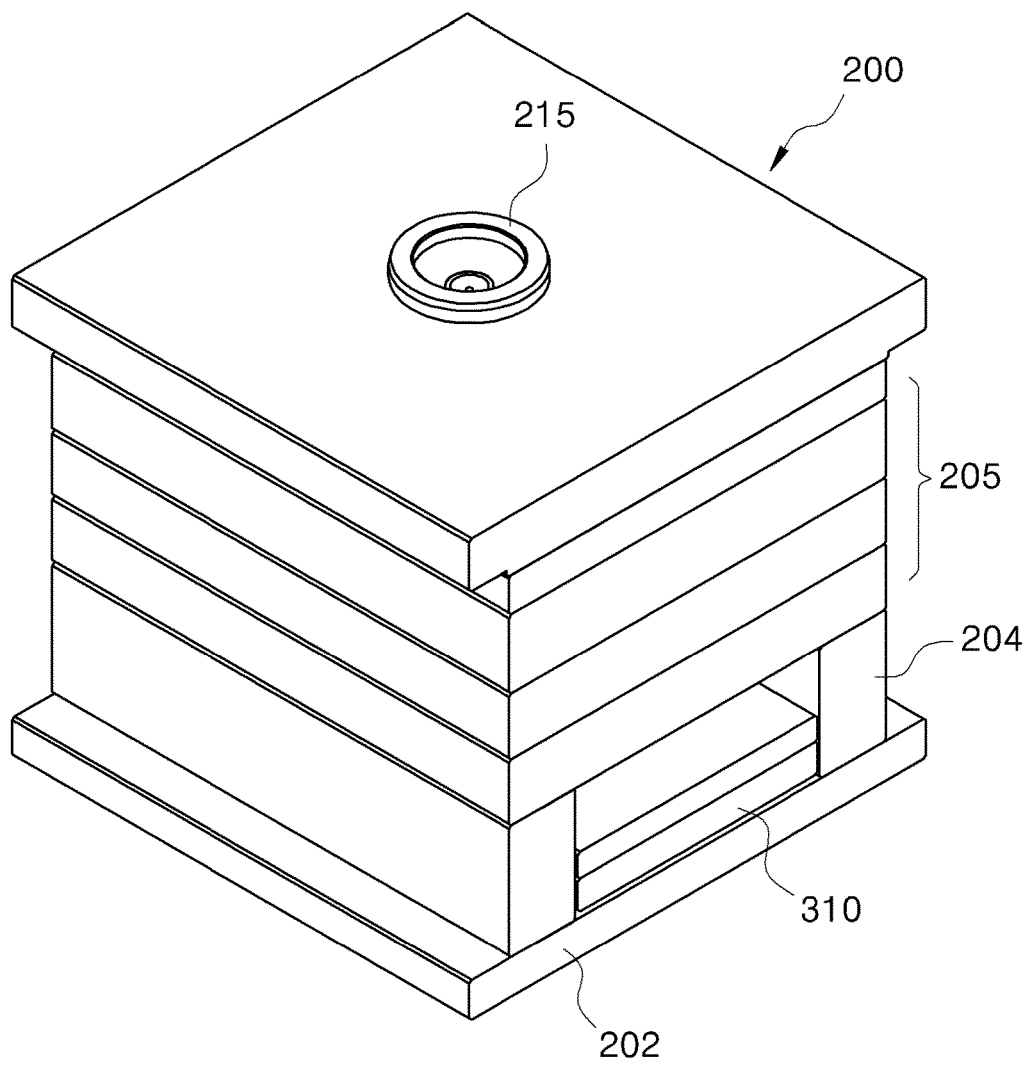
FIG. 2 is a perspective view showing a product injection mold according to the present disclosure.
Figure 3:
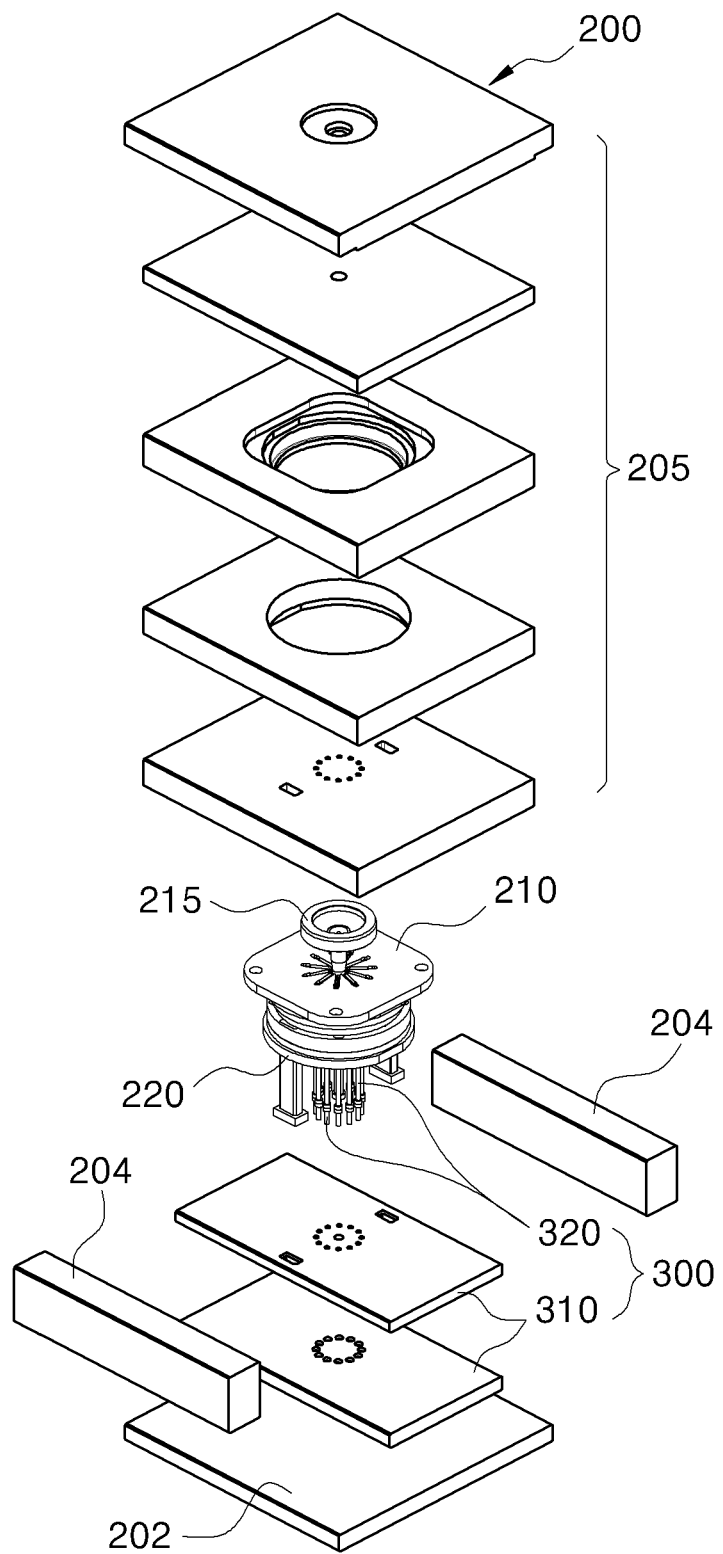
FIG. 3 is an exploded perspective view of FIG. 2.
Figure 4:
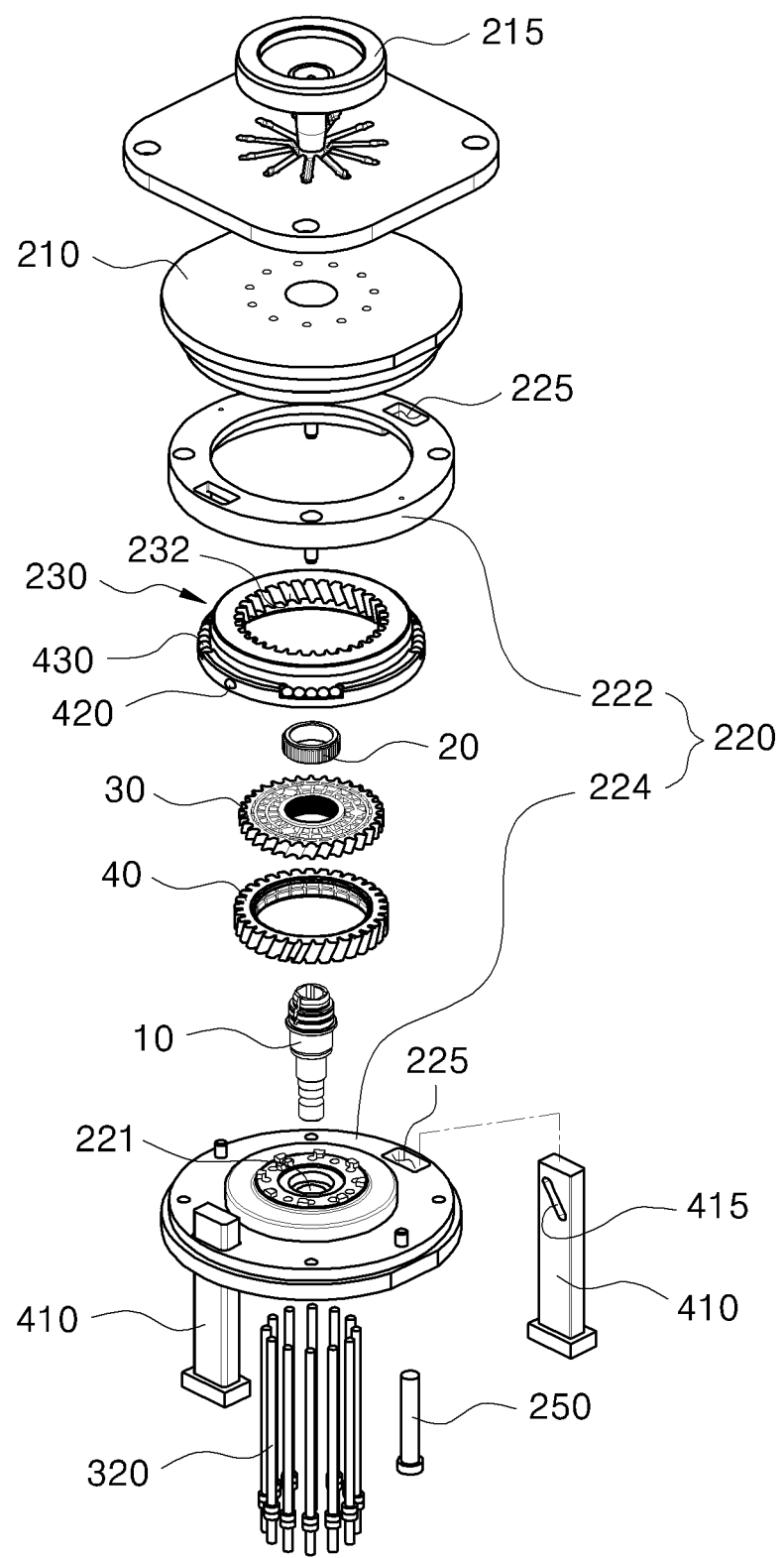
FIG. 4 is an exploded perspective view of a movable side core and a fixed side core according to the present disclosure.
Figure 5:
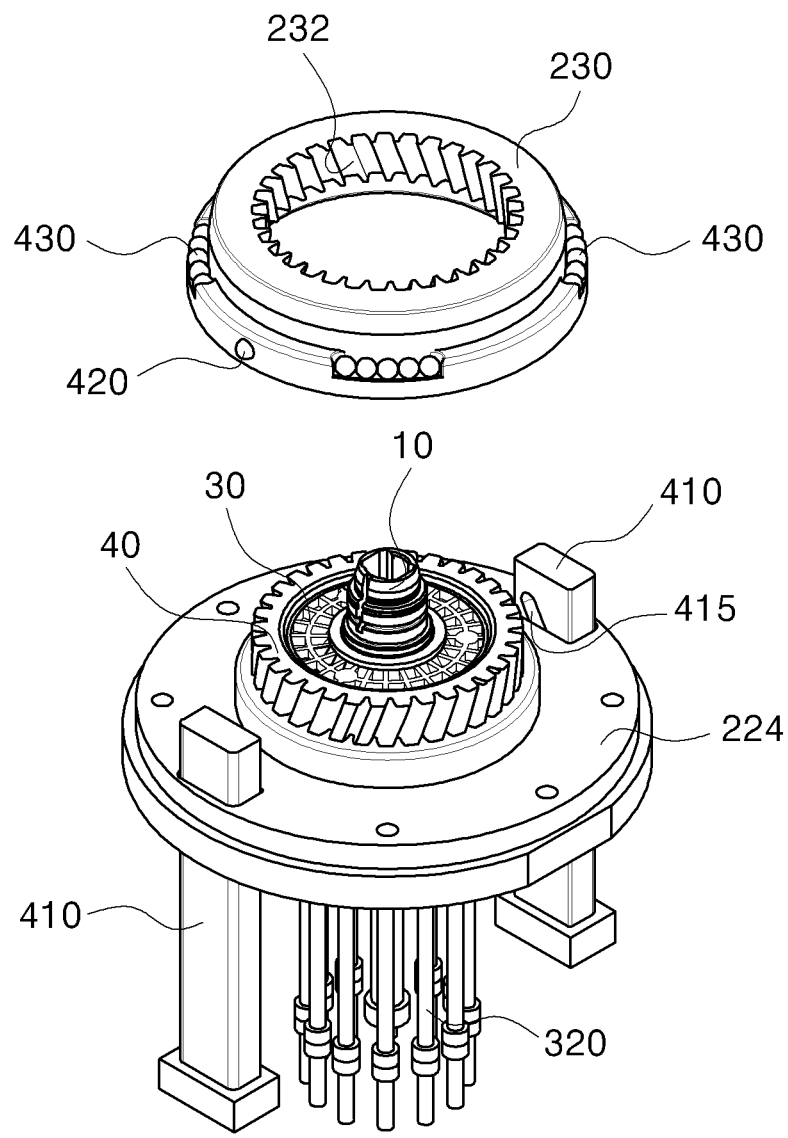
FIG. 5 is a perspective view showing a guide unit according to the present disclosure.

Referring to FIGS. 1 to 5, an injection molding apparatus for a worm wheel according to the present disclosure includes: a boss injection mold 100 having a movable side template 120 and a fixed side template 110 for integrally molding a worm wheel hub 20 and a worm wheel boss 30 through which a worm wheel shaft 10 is press-fitted; a product injection mold 200 having a movable side core 220 on which a worm wheel boss 30 integrated with a worm wheel hub 20 by the boss injection mold 100 is mounted to move forward and backward, a fixed side core 210 whose inner side surface is placed to face the movable side core 220 and on an outer side of which a resin injection inlet 215 is provided, and a worm gear tooth-shaped core 230 placed on an inner side of the movable side core 220 and configured in a gear tooth shape of a worm gear on an inner circumferential surface thereof; and a take-out unit 300 for taking out a worm wheel product 50 formed with a worm gear by the product injection mold 200. The take-out unit 300 includes: a plurality of take-out pins 320 coupled to penetrate the movable side core 220; a take-out plate 310 coupled to have ends of the plurality of take-out pins 320 fixed; and a guide unit 400 guiding rotation of the worm gear tooth-shaped core 230 at the time of taking out the worm wheel product 50.

More specifically, the boss injection mold 100 is for integrally molding the worm wheel hub 20 and the worm wheel boss 30. The boss injection mold 100 includes a movable side template 120, a fixed side template 110, 130, and a core block 130 which are known to form the worm wheel boss 30.

The product injection mold 200 is for integrally molding the worm wheel boss 30 and a gear forming portion 40. The worm wheel hub 10 is for integrally molding the gear forming portion 40 on an outer side of the worm wheel boss 30 by injecting a resin into a cavity provided outside the worm wheel boss 30 integrated in a state the worm wheel shaft 10 is coupled to the worm wheel hub 20.

The product injection mold 200 for this purpose is configured to include upper and lower parts in the accompanying figures, but actually, the fixed side core 210 and the movable side core 220 of the product injection mold 200 may be arranged to include left and right parts.

That is, the product injection mold 200 includes a fixed side core 210 having a resin injection inlet 215 on an outer side thereof, a movable side core 220 placed to face the fixed side core 210, a worm gear tooth-shaped core 230 placed on an inner side of the movable side core 220, and a take-out unit 300 for taking out a molded worm wheel product 50 to an outside of the product injection mold 200 in a de-molding process, that is, a process of taking out the worm wheel product 50 from the product injection mold 200.

The movable side core 220 has a structure that the worm wheel boss 30 integrated with the worm wheel hub 20 by the boss injection mold 100 is mounted on one side of the movable side core 220, and that a cavity is formed between an outer side of the mounted worm wheel boss 30 and an inner circumferential surface of the movable core 220.

The surfaces of the movable side core 220 and the fixed side core 210 facing each other have a shape corresponding to the shape of the worm wheel boss 30.

The movable side core 220 includes a first movable side core 222 that surrounds the outer side of the worm gear tooth-shaped core 230 and a second movable side core 224 that is coupled by means of a pin to the lower side of the first movable side core 222. The worm gear tooth-shaped core 230 has gear teeth 232 formed on the inner circumferential surface thereof, which correspond to the gear teeth of the worm gear.

The product injection mold 200 includes: a base plate 202; a support block 204 coupled to the base plate 202; and a plurality of cover blocks 205 stacked on the support block 204 and surrounding the fixed side core 210 and the movable side core 220.

In addition, the product injection mold 200 is configured to have a worm wheel shaft 10 fitted in a hollow formed at the center of the movable side core 220 and to be provided with a support shaft 250 supporting the worm wheel shaft 10 and interlocked with the take-out plate 310 at a lower portion of the worm wheel shaft 10.

The guide unit 400 guiding rotation of the worm gear tooth-shaped core 230 includes: rectangular cross-sectional structure guide bars 410 vertically penetrating both sides of the movable side core 220 and whose lower portions are fixedly coupled to be interlocked to the take-out plate 310 and having a guide groove 415 formed at an inclined angle on an inner side of each of the guide bars 410 facing each other; and ball members 420 whose outer circumferential surfaces are coupled to protrude on an outer circumference of the worm gear tooth-shaped core 230 in which the protruded outer circumferential portions of the worm gear tooth-shaped core 230 are received in the guide grooves 415.

That is, the guide groove 415 has a structure formed so as to have an inclination angle corresponding to the gear teeth of the gear forming portion 40.

The ball members 420 have a structure in which they are slidable in the inclined guide grooves 415 in the rotating operation of the worm gear tooth-shaped core 230.

In addition, it is preferable that the guide unit 400 further include a plurality of ball bearings 430 interposed between an outer circumferential surface of the worm gear tooth-shaped core 230 and the movable side core 220.

The first and second movable side cores 222 and 224 are formed with coupling holes 225 through which the guide bars 410 pass.

In the case of the injection molding apparatus according to the present disclosure having such a configuration, the worm wheel hub 20 is seated in the movable side template 120 of the boss injection mold 100 so that the worm wheel shaft 10 is press-fitted into the boss injection mold 100 and then the movable side template 120 and the fixed side template 110 are assembled with each other. Then, the worm wheel boss 30 is molded integrally with the worm wheel hub 20 by injecting a resin into an inner space of an assembly core block 130 through the resin injection inlet 215.

Subsequently, a product of the worm wheel boss 30, which is integrally formed with the worm wheel hub 20, is taken out by using a push plate 140 and a push pin 145, in a state where the movable side template 120 and the fixed side template 110 are disassembled with each other and thus the movable side template 120 and the fixed side template 110 are opened.

Meanwhile, in an injection molding process of the product injection mold 200, the worm wheel shaft 10 having the worm wheel hub 20 integrated with the worm wheel boss 30 integrated by the boss injection mold 100 is inserted, penetrated, and press-fitted into a hollow portion 221 of the movable side core 220. The movable side core 210 is moved toward the fixed side core 210, so that the fixed side core 210 and the movable side core 220 are connected to each other, and then a liquid-phase resin is injected through the resin injection inlet 215, into the cavity of the worm gear tooth-shaped core 230 placed between the fixed side core 210 and the movable side core 220 which are assembled with each other.

As the injected resin is hardened through a cooling process, a gear tooth-shaped form corresponding to the gear teeth of the worm gear tooth-shaped core 230 is molded into a gear forming portion 40, and the molded gear forming portion 40 is molded integrally onto an outer side of the worm wheel boss 30, to thus be manufactured into the worm wheel product 50.

A process of disassembling the combined movable side core 220 and fixed side core 210 is achieved by separating the movable side core 220 from the fixed side core 210 when moving the movable side core 220 backward.

Here, the ball members 420 are positioned at the uppermost end of the guide grooves 415.

Figure 6:
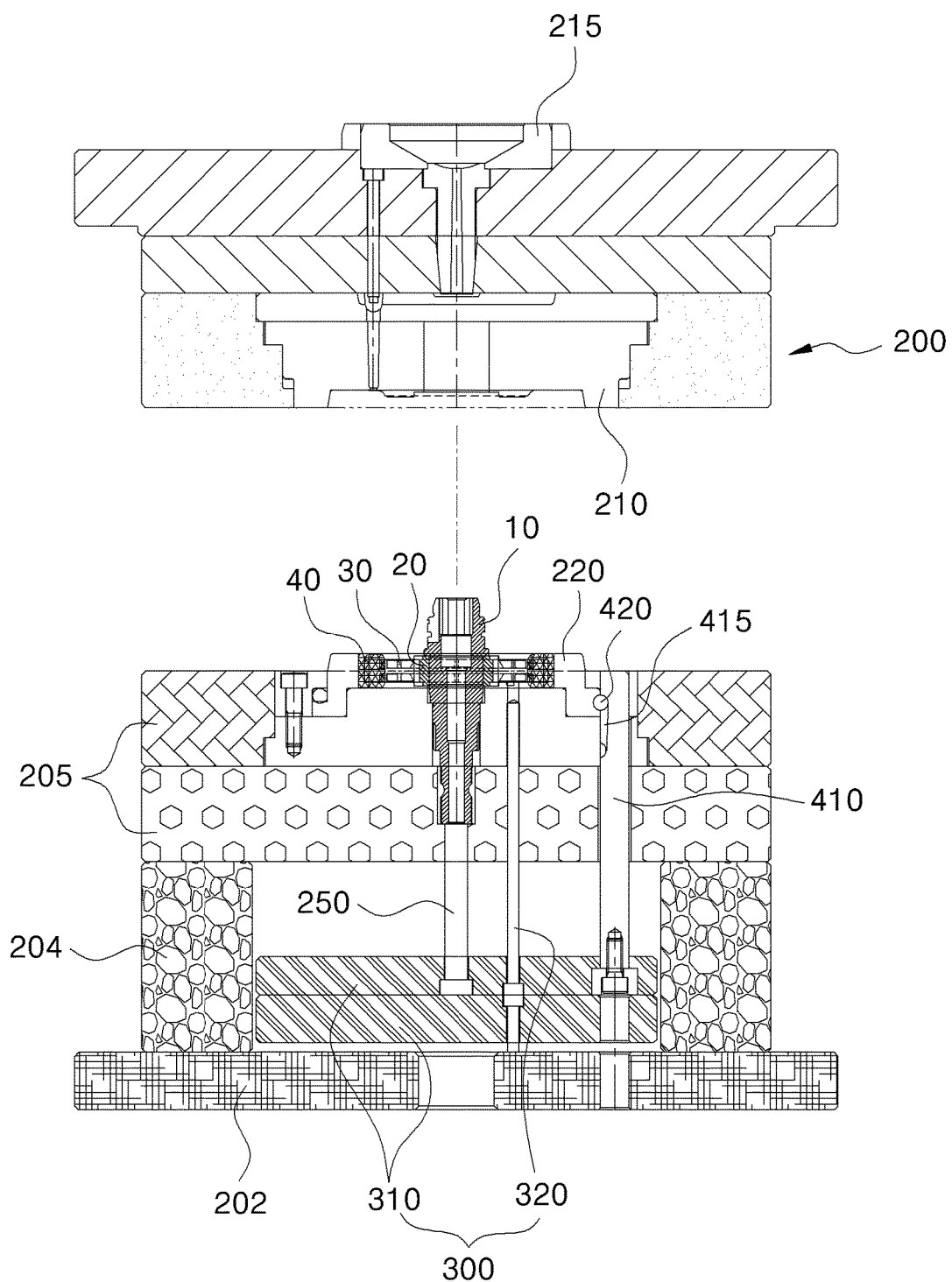
FIGS. 6 and 7 are use state diagrams showing a state in which the movable side core according to the present disclosure is operated to move backward and the worm wheel product is taken out, respectively.

Then, as shown in FIG. 6, the take-out process for taking out the worm wheel product 50 to the outside is accomplished by lifting up and separating the worm wheel product 50 from the movable side core 220 while the take-out pins 320 and the supporting shaft 250 which are supported on the take-out plate 310 are moved forward, when the take-out plate 310 is advanced to the fixed side core 210.

Figure 7:
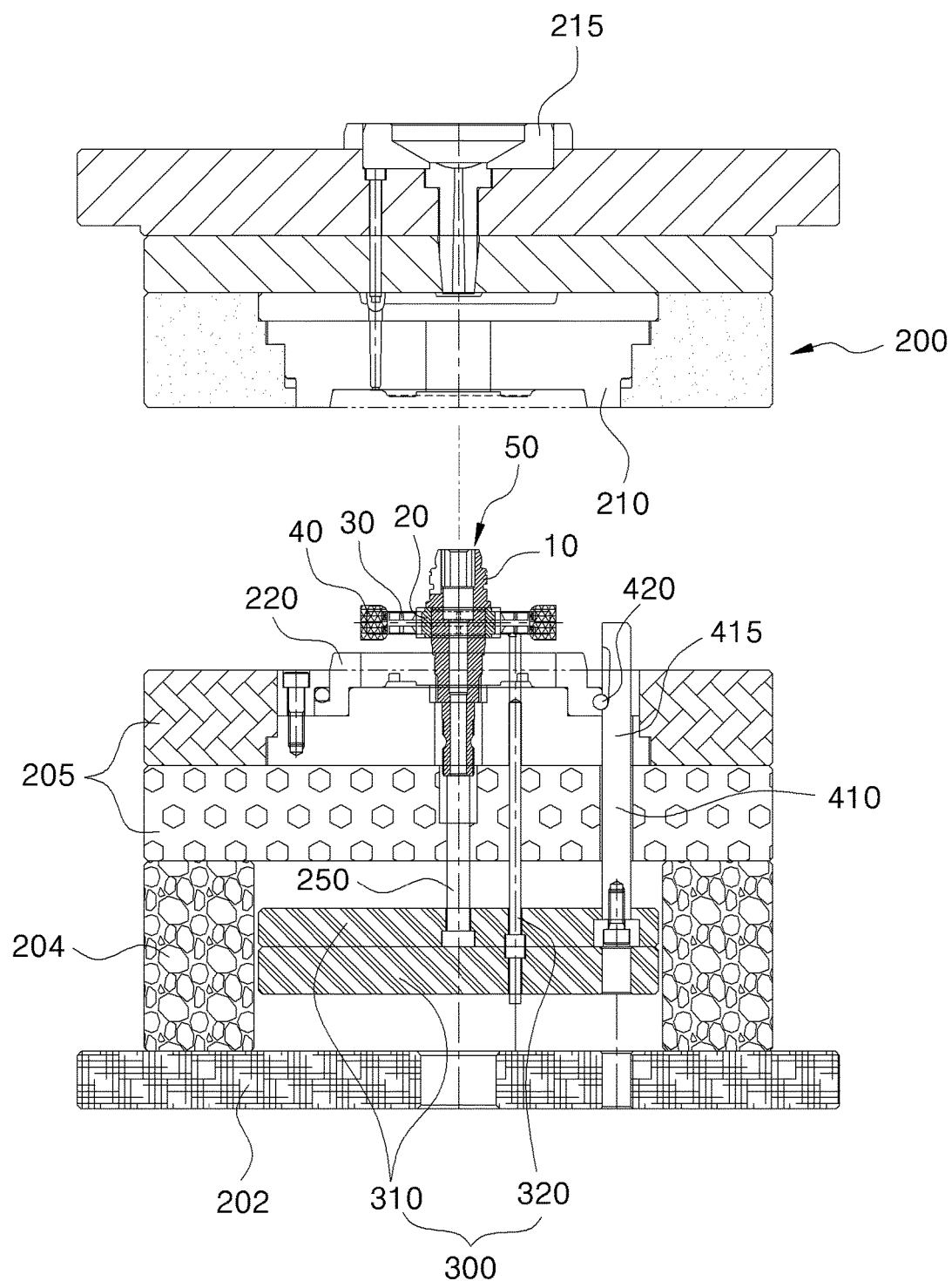

In this case, as shown in FIG. 7, the take-out operation for taking out the worm wheel product 50 to the outside is accomplished by rotating the worm gear tooth-shaped core 230 with the frictional force generated due to the structural characteristics of the inner circumferential surface of the worm gear tooth-shaped core 230 and the gear teeth formed on the outer circumferential edge of the gear forming portion 40, and with the movement of the guide bars 410 interlocked with the worm gear tooth-shaped core 230 during the forward movement of the worm gear tooth-shaped core 230, and sliding the ball members 420 protruding on the outer circumference of the worm gear tooth-shaped core 230 along the guide grooves 415 at an inclined angle formed inside the guide bars 410 and moving the ball members 420 downward during the rotation of the worm gear tooth-shaped core 230.

Accordingly, at the time of taking out the worm wheel product 50, the ball members 420 housed in the guide grooves 415 are slid along the inclination angle of the guide grooves 415 and the gear teeth of the gear forming portion 40 do not interfere with the gear teeth 232 formed on the inner circumferential surface of the worm gear tooth-shaped core 230 even in the rotating direction of the worm gear tooth-shaped core 230, to thereby achieve a natural take-out operation.

In addition, the ball bearings 430 are interposed between the worm gear tooth-shaped core 230 and the first movable side core 222 to perform a function of supporting a rotating operation of the worm wheel tooth-shaped core 230 in order to reduce a frictional force during rotation of the worm gear tooth-shaped core 230.

As described above, a worm wheel shaft 10 and a worm wheel hub 20 are integrally formed with a worm wheel boss 30 in a state where the worm wheel shaft 10 and the worm wheel hub 20 are axially coupled by a boss injection mold 100, a gear forming portion 40 is integrally formed on an outside of the worm wheel boss 30 integrated with the worm wheel hub 20 by a product injection mold 200, and rotation of a worm gear tooth-shaped core 230 is guided during a process of taking out the worm wheel product 50 manufactured by the product injection mold 200, to thereby improve a mold ability by eliminating an interference phenomenon of a gear undercut portion of the gear teeth of the gear forming portion 40, and molding a gear tooth shape of a worm wheel without a separate hobbing operation, to thus provide a useful advantage.

What is claimed is:

1. An injection molding apparatus for a worm wheel, the injection molding apparatus comprising:
   a boss injection mold;
   a product injection mold having a movable side core on which a worm wheel boss integrated with a worm wheel hub into which a worm wheel shaft is press-fitted by the boss injection mold is mounted to move forward and backward, a fixed side core whose inner side surface is placed to face the movable side core and on an outer side of which a resin injection inlet is provided, and a worm gear tooth-shaped core placed on an inner side of the movable side core and configured in a gear tooth shape of a worm gear on an inner circumferential surface thereof; and
   a take-out unit for taking out a worm wheel product formed with a worm gear by the product injection mold,
   wherein the take-out unit comprises: a plurality of take-out pins coupled to penetrate the movable side core; a take-out plate coupled to have ends of the plurality of take-out pins fixed; and a guide unit guiding rotation of the worm gear tooth-shaped core at the time of taking out the worm wheel product.

2. The injection molding apparatus of claim 1, wherein the guide unit comprises: guide bars vertically penetrating both sides of the movable side core and whose lower portions are coupled to be fixed to the take-out plate and having a guide groove formed at an inclined angle on an inner side of each of the guide bars facing each other; and ball members which are coupled to protrude on an outer circumference of the worm gear tooth-shaped core in which the protruded outer circumferential portions of the worm gear tooth-shaped core are received in the guide grooves.

3. The injection molding apparatus of claim 2, wherein the guide unit further comprises a plurality of ball bearings arranged to be interposed between an outer circumferential surface of the worm tooth-shaped core and the movable side core.

* * * * *